United States Patent [19]
Reinhold, III et al.

[11] Patent Number: 5,906,673
[45] Date of Patent: May 25, 1999

[54] PRESSURE SWING SYSTEM WITH AUXILIARY ADSORBENT BED

[75] Inventors: Herbert W. Reinhold, III, The Woodlands; Mark Huber, Andrews; David R. King, Houston, all of Tex.

[73] Assignee: Nitrotec Corporation, New York, N.Y.

[21] Appl. No.: 08/857,073

[22] Filed: May 15, 1997

[51] Int. Cl.⁶ .................................................. B01D 53/047
[52] U.S. Cl. ................................. 95/45; 95/96; 95/103; 95/139
[58] Field of Search ............................ 95/43, 45, 96–98, 95/100–105, 139

[56] References Cited

U.S. PATENT DOCUMENTS

| | | | |
|---|---|---|---|
| 3,085,379 | 4/1963 | Kiyonaga et al. | 55/23 |
| 3,101,261 | 8/1963 | Skarstrom | 95/98 |
| 3,141,748 | 7/1964 | Hoke et al. | 95/99 |
| 3,176,444 | 4/1965 | Kiyonaga | 95/97 X |
| 3,246,449 | 4/1966 | Stern et al. | 95/53 |
| 3,250,080 | 5/1966 | Garwin | 62/24 |

(List continued on next page.)

FOREIGN PATENT DOCUMENTS

| | | |
|---|---|---|
| 071 553 | 2/1983 | European Pat. Off. . |
| 092 695 | 11/1983 | European Pat. Off. . |
| 0 394 947 | 10/1990 | European Pat. Off. . |
| 4-90819 | 3/1992 | Japan . |
| WO 88/09306 | 12/1988 | WIPO . |

OTHER PUBLICATIONS

C. Tannehill et al; Nitrogen Removal Costs Vary By Concentration; The American Oil & Gas Reporter; pp. 54–61; May 1994.

R.J. Buras et al; Nitrogen Rejection with Pressure Swing Adsorption: Principles Design, and Remote Control using an Expert System—Univ. of Oklahoma Laurance Reid Gas Conf.; pp. 93–101; Feb. 28–Mar. 2, 1994.

T.C. Frankiewicz et al; Methane/Nitrogen Gas Separation over the Zeolite Clinoptilolite by the Selective Adsorption of Nitrogen; American Chemical Society; pp. 213–233; 1983.

L.H. Shendalman et al; A Study of Heatless Adsorption in the Model System $CO_2$ in He, I; Chemical Engineering Science, vol. 27, pp. 1449–1458; 1972.

J.E. Mitchell et al; Study of Heatless Adsorption in the Model System $CO_2$ in He: Part II, Esso Reasearch and Engineering Co.; pp. 25–32; 1973.

H. C. Cheng et al; Recovery and Purification of Light Gases by Pressure Swing Adsorption; American Chemical Society; pp. 195–211; 1983.

D.E. Kowler et al; The Optimal Control of a Periodic Adsorber; Univ. of Michigan pp. 1207–1219; Nov. 1972.

P.H. Turnock et al; Separation of Nitrogen and Methane via Periodic Adsorption; Univ. of Michigan; vol. 17, No. 2, pp. 335–342; Mar. 1971.

(List continued on next page.)

*Primary Examiner*—Robert Spitzer
*Attorney, Agent, or Firm*—Cammarata & Grandinetti

[57] ABSTRACT

The invention is a pressure swing adsorption system. The pressure swing adsorption system has a plurality of primary adsorbent beds and at least one secondary adsorbent bed. The feed gas stream is flowed to a primary adsorbent bed loaded with an adsorbent that will preferentially adsorb certain components in the feed gas. Non-preferentially adsorbed components flow from the adsorbent bed during this time. Upon saturation of the adsorbent with the adsorbed components, the flow of feed gas is ceased. The adsorbent is fully loaded with the preferentially adsorbed component and there is feed gas in the void space between the adsorbent particles. This primary adsorbent bed undergoes regeneration by partial depressurization through the secondary adsorbent bed followed by a complete depressurization to a final lower pressure. There can be two or more primary adsorbent beds and there will be at least one secondary adsorbent bed. The preferred separation is the separation of carbon dioxide from a hydrocarbon containing stream.

22 Claims, 5 Drawing Sheets

U.S. PATENT DOCUMENTS

| | | | |
|---|---|---|---|
| 3,266,221 | 8/1966 | Avery | 95/105 |
| 3,324,626 | 6/1967 | Dresser et al. | 95/39 |
| 3,636,679 | 1/1972 | Batta | 95/100 |
| 3,683,589 | 8/1972 | Seitz et al. | 95/26 |
| 3,751,878 | 8/1973 | Collins | 95/105 |
| 3,788,036 | 1/1974 | Lee et al. | 95/101 |
| 3,797,201 | 3/1974 | Tamura | 95/105 |
| 3,838,553 | 10/1974 | Doherty | 95/98 |
| 3,944,400 | 3/1976 | Bird | 95/11 |
| 3,977,845 | 8/1976 | Walter | 95/100 |
| 4,015,956 | 4/1977 | Müzner et al. | 95/96 |
| 4,077,779 | 3/1978 | Sircar et al. | 95/101 X |
| 4,077,780 | 3/1978 | Doshi | 95/100 |
| 4,160,651 | 7/1979 | Pivard | 95/97 |
| 4,171,207 | 10/1979 | Sircar | 95/101 |
| 4,194,890 | 3/1980 | McCombs et al. | 95/98 X |
| 4,259,091 | 3/1981 | Benkmann | 95/98 |
| 4,299,596 | 11/1981 | Benkmann | 95/100 |
| 4,305,734 | 12/1981 | McGill | 95/102 |
| 4,381,189 | 4/1983 | Fuderer | 95/100 |
| 4,444,572 | 4/1984 | Avon et al. | 95/97 |
| 4,512,779 | 4/1985 | Haÿ | 95/100 |
| 4,512,780 | 4/1985 | Fuderer | 95/100 |
| 4,529,412 | 7/1985 | Hayashi et al. | 95/96 |
| 4,539,020 | 9/1985 | Sakuraya et al. | 95/101 |
| 4,578,089 | 3/1986 | Richter et al. | 95/101 |
| 4,581,044 | 4/1986 | Uno et al. | 95/96 |
| 4,599,094 | 7/1986 | Werner et al. | 95/101 |
| 4,661,125 | 4/1987 | Haruna et al. | 95/102 |
| 4,666,468 | 5/1987 | Wu | 95/47 |
| 4,675,030 | 6/1987 | Czarnecki | 95/39 |
| 4,687,498 | 8/1987 | Maclean et al. | 95/98 X |
| 4,689,062 | 8/1987 | Mclean et al. | 95/99 X |
| 4,690,695 | 9/1987 | Doshi | 95/55 |
| 4,701,187 | 10/1987 | Choe et al. | 95/98 X |
| 4,705,541 | 11/1987 | Sicar | 95/98 |
| 4,711,645 | 12/1987 | Kumar | 95/98 |
| 4,717,407 | 1/1988 | Choe et al. | 95/53 X |
| 4,732,577 | 3/1988 | Koizumi et al. | 95/101 |
| 4,750,925 | 6/1988 | Maclean et al. | 95/96 X |
| 4,752,311 | 6/1988 | Maclean et al. | 95/128 X |
| 4,765,804 | 8/1988 | Lloyd-Williams et al. | 95/54 |
| 4,770,676 | 9/1988 | Sicar et al. | 95/99 |
| 4,784,672 | 11/1988 | Sicar | 95/97 |
| 4,790,858 | 12/1988 | Sicar | 95/101 |
| 4,813,977 | 3/1989 | Schmidt et al. | 95/102 |
| 4,813,980 | 3/1989 | Sicar | 95/101 |
| 4,816,039 | 3/1989 | Krishnamurthy et al. | 95/97 |
| 4,836,833 | 1/1989 | Nicholas et al. | 95/55 |
| 4,846,851 | 7/1989 | Guro et al. | 95/100 |
| 4,848,985 | 7/1989 | Sadkowski | 95/100 |
| 4,861,361 | 8/1989 | Jain et al. | 95/96 X |
| 4,863,492 | 9/1989 | Doshi et al. | 95/98 X |
| 4,869,894 | 9/1989 | Wang et al. | 95/101 |
| 4,892,565 | 1/1990 | Schmidt et al. | 95/101 |
| 4,913,709 | 4/1990 | Kumar | 95/100 |
| 4,914,218 | 4/1990 | Kumar et al. | 95/100 |
| 4,915,711 | 4/1990 | Kumar | 95/101 |
| 5,004,482 | 4/1991 | Haas et al. | 95/96 X |
| 5,006,132 | 4/1991 | DiMartino, Sr. et al. | 95/53 |
| 5,013,334 | 5/1991 | Maurer | 95/100 |
| 5,015,272 | 5/1991 | Okada et al. | 95/26 |
| 5,026,406 | 6/1991 | Kumar | 95/101 |
| 5,064,446 | 11/1991 | Kusuki et al. | 95/53 |
| 5,080,694 | 1/1992 | Knoblauch et al. | 95/26 |
| 5,089,048 | 2/1992 | Knoblauch et al. | 95/103 |
| 5,089,565 | 2/1992 | Knoblauch et al. | 55/26 |
| 5,112,590 | 5/1992 | Krishnamurthy et al. | 95/102 X |
| 5,133,785 | 7/1992 | Kumar et al. | 95/101 |
| 5,156,656 | 10/1992 | Parker et al. | 95/53 |
| 5,171,333 | 12/1992 | Maurer | 95/100 |
| 5,174,796 | 12/1992 | Davis et al. . | |
| 5,207,806 | 5/1993 | Lagree et al. | 55/16 |
| 5,224,350 | 7/1993 | Mehra | 62/17 |
| 5,224,507 | 7/1993 | Mehra | 62/17 |
| 5,226,931 | 7/1993 | Combier | 55/16 |
| 5,232,473 | 8/1993 | Karpoor et al. | 55/26 |
| 5,234,472 | 8/1993 | Krishnamurthy et al. | 95/98 |
| 5,248,322 | 9/1993 | Kumar | 95/101 |
| 5,254,154 | 10/1993 | Gauthier et al. | 95/12 |
| 5,332,424 | 7/1994 | Rao et al. | 95/47 |
| 5,344,480 | 9/1994 | Schulte et al. | 95/52 |
| 5,354,346 | 10/1994 | Kumar | 95/101 |
| 5,354,547 | 10/1994 | Rao et al. | 423/650 |
| 5,370,728 | 12/1994 | LaSala et al. | 95/130 X |
| 5,382,280 | 1/1995 | Choe et al. | 95/98 |
| 5,411,721 | 5/1995 | Doshi et al. | 423/220 |
| 5,507,856 | 4/1996 | Rao et al. | 95/50 |
| 5,536,300 | 7/1996 | Reinhold, III et al. | 95/101 |
| 5,542,966 | 8/1996 | D'Amico et al. | 95/101 |
| 5,565,018 | 10/1996 | Baksh et al. | 95/101 |

OTHER PUBLICATIONS

H.C. Cheng et al; Separation of Helium–Methane Mixtures by Pressure Swing Adsorption; AIChE Journal; vol. 31, No. 1; pp. 95–102; Jan. 1985.

M.W. Ackley et al; Kinetic Separation by Pressure Swing Adsorption: Method of Characteristics Model; AIChE Journal; vol. 36; pp. 1229–1238; Aug. 1990.

G. Bird et al; Separation of Nitrogen from Helium Using Pressure–Swing Adsorption; Univ. of Bradford, United Kingdom, pp. 463–473; 1973.

M.S.A. Baksh et al; A New Composite Sorbent for Methane–Nitrogen Separation by Adsorption; Separation Science and Technology; pp. 845–868; 1990.

| | ADSORBENT BED STEPS | | | | | | | | |
|---|---|---|---|---|---|---|---|---|---|
| | 1 | 2 | 3 | 4 | 5 | 6 | 7 | 8 | 9 |
| PRIMARY ADSORBENT BED A | ADS | ADS | ADS | ADS | ADS | EQ | DEPRES | EVAC | REPRES |
| PRIMARY ADSORBENT BED B | ADS | ADS | EQ | DEPRES | EVAC | REPRES | ADS | ADS | ADS |
| PRIMARY ADSORBENT BED C | DEPRES | EVAC | REPRESS | ADS | ADS | ADS | ADS | ADS | EQ |
| SECONDARY ADSORBENT BED S | DEPRES | EVAC | EQ | DEPRES | EVAC | EQ | DEPRES | EVAC | EQ |

FIG. 5

PRESSURE SWING SYSTEM WITH AUXILIARY ADSORBENT BED

BACKGROUND OF THE INVENTION

1. Field of the Invention

This invention relates to the separation of gaseous mixtures by pressure swing adsorption systems that utilize a plurality of primary adsorbent beds and at least one auxiliary secondary adsorbent bed. More particularly, this invention relates to the separation of gases wherein there are at least two primary adsorbent beds and at least one auxiliary secondary adsorbent bed, the auxiliary secondary adsorbent bed being interconnected to the adsorbent bed undergoing regeneration.

2. Description of Related Art

One of the various processes for the separation of gaseous mixtures is through the use of pressure swing adsorption. In a pressure swing adsorption system, one or more gases will be preferentially adsorbed by an adsorbent contained in a chamber. Other gases in the mixture are not so preferentially adsorbed and pass through the adsorbent-filled chamber. The desired product gas or gases can be those that are preferentially adsorbed or those that pass through the adsorbent chamber. Upon the adsorbent in a chamber being saturated with the preferentially adsorbed gas or gases, the flow of gas into the chamber ceases and the adsorbent in the chamber undergoes one or more regeneration steps. At this point, the preferentially adsorbed gases are adsorbed on the adsorbent and the void space between the adsorbent particles is filled with gas of essentially input feed gas composition. During regeneration the preferentially adsorbed gas or gases are removed from the loaded adsorbent. The techniques and processing steps used to remove the preferentially adsorbed gas or gases and the degree to which they recover the gases in the void space will determine the efficiency of the pressure swing adsorption system.

Pressure swing adsorption systems usually are comprised of two or more adsorbent beds with an adsorbent bed being a quantity of adsorbent contained within a chamber. In most instances two to four adsorbent beds will be used. But there are systems that use more than four adsorbent beds, and there are single adsorbent bed systems. However, two to four adsorbent beds appear to provide cost advantages when both capital costs and operating costs are considered.

The adsorbents that are used in these pressure swing systems can be wide-pore adsorbents or they can be molecular sieves. A wide-pore adsorbent has wide pores and will admit most or all of the components of a gaseous mixture and preferentially attract and retain one or more of the components. A molecular sieve is a material that has pores of a specific size through which one or more of the components of the gaseous mixture will pass and then be adsorbed within the pore structure. The components of the gaseous mixture that will pass into the pores of the adsorbent are of a molecular size equal to or less than the pores of the adsorbent. In these adsorbents there is a sieving and an adsorbing.

The present invention is directed to pressure swing adsorption systems having a greater efficiency. These pressure swing adsorption systems can use wide-pore adsorbents or molecular sieve adsorbents. Although the pressure swing adsorption systems can be used for many different gaseous separations, the pressure swing adsorption systems are very useful for the preferential adsorption of carbon dioxide and the removal of carbon dioxide from hydrocarbon containing streams. In such separations a molecular sieve adsorbent preferably is used.

The systems of the present invention use a plurality of primary adsorbent beds and at least one secondary adsorbent bed. The secondary adsorbent bed does not receive the feed gas stream to the pressure swing adsorption system, but rather is interconnected to a primary adsorbent bed while that adsorbent bed is undergoing regeneration. By the use of a secondary adsorbent bed during regeneration, there is a greater recovery of the gases that are not preferentially adsorbed. When two primary adsorbent beds are used, there will be an intermittent production of the less preferentially adsorbed gases while in the use of three or more primary adsorbent beds there can be a continuous production of the less preferentially adsorbed gases from the system.

The feed gas to the pressure swing adsorption system can be a gas with little or no prior processing or can be a gas that has been processed, as for instance in a membrane separation unit. If the feed gas to the pressure swing adsorption system is a gas from a membrane separation unit it usually will be the permeate gas stream. However, it could be the non-permeate residual stream. In such an instance where the feed gas to the pressure swing adsorption system is the permeate stream, the non-permeate stream usually will be rich in a primary product gas while the permeate feed gas usually will be rich in a secondary product gas and contain some primary product gas. The primary product gas and secondary product gas will then be separated in the pressure swing adsorption system. The separated primary product gas from the pressure swing adsorption system usually will be compressed and combined with the non-permeate residual gas from the membrane separation unit. When the feed gas to the pressure swing adsorption system is the permeate stream from the membrane separation unit, the pressure swing adsorption system can be sized smaller since a portion of the input feed has been removed as residual gas.

SUMMARY OF THE INVENTION

The present invention is directed to the removal of at least one component of a gas feed stream utilizing a pressure swing adsorption system. The pressure swing adsorption system has a plurality of primary adsorbent beds and at least one secondary adsorbent bed. The feed gas stream is flowed to a primary adsorbent bed until it is completely loaded with preferentially adsorbed gas or gases. Non-preferentially adsorbed gases flow from the adsorbent bed during this time. At the point just prior to breakthrough of the preferentially adsorbed gas or gases from the exit end of the adsorption bed, the flow of the feed gas stream gases ceases. The adsorbent bed is now fully loaded with the preferentially adsorbed gas or gases and the void space between the adsorbent particles is filled with feed gas. The bed must now be regenerated prior to repeating the adsorption step. A primary adsorbent bed is regenerated by depressurization and evacuation. By dropping the pressure in this manner, the adsorbed gases are released from the adsorbent. In order to maximize the efficiency of the process, it is necessary to recover the void space gas during this regeneration phase. In this invention, the void space gas is recovered by flowing the depressurization gas from the primary adsorbent bed through a smaller, secondary adsorbent bed. In this manner the non-preferentially adsorbed gases are recovered by separating them from the preferentially adsorbed gases in the void space. The non-preferentially adsorbed gases can then be used to repressurize a primary adsorption bed.

A primary adsorbent bed is interconnected to a secondary adsorbent bed to regenerate the primary adsorbent bed after the primary adsorbent bed has completed an adsorption phase. After a primary adsorbent bed and a secondary adsorbent bed are interconnected, the primary adsorbent bed undergoes a pressure equalization phase where the pressure in the two adsorbent beds is equalized. During this phase the secondary adsorbent bed receives a gas that is similar in composition to the feed gas stream. The secondary adsorbent bed will preferentially adsorb the same gaseous components as the primary adsorbent bed. A gas similar to that which was not preferentially adsorbed in the primary adsorbent bed during the adsorption phase will flow from the secondary adsorbent bed. This gas from the secondary adsorbent bed is flowed to a storage tank for subsequent use in repressurizing an adsorbent bed that is to undergo an adsorption phase or is flowed directly to such an adsorbent bed that is undergoing a repressurization phase.

After a primary adsorbent bed and a secondary adsorbent bed have undergone a pressure equalization phase, the two adsorbent beds while still interconnected are depressurized to a first lower pressure, and preferably to about atmospheric pressure. This depressurization gas, which flows from the secondary adsorbent bed, is similar in composition to the feed gas stream and can be pressurized and fed with feed gas to an adsorbent bed undergoing an adsorption phase, or can be used elsewise in the system, such as a fuel for operating plant equipment.

After the depressurization phase the primary adsorbent bed and secondary adsorbent bed are retained connected and the pressure in the two adsorbent beds reduced to a yet lower pressure in an evacuation phase, and preferably to substantially less than atmospheric pressure. In this phase the components of the feed gas stream that have been adsorbed by the adsorbent in the primary adsorbent bed and in the secondary adsorbent bed are removed from the adsorbent in these beds. These components can be recovered or discarded depending on their economic value.

The primary adsorbent bed and the secondary adsorbent bed are now in a regenerated condition. These primary and secondary adsorbent beds are disconnected, and the primary adsorbent bed undergoes a repressurization phase. In this phase the gas recovered in the pressure equalization phase is flowed to this primary adsorbent bed to increase the pressure in this primary adsorbent bed. This repressurized primary adsorbent bed is then preferably further pressurized with input feed gas and then undergoes another adsorption phase by the flow of the feed gas stream to this primary adsorbent bed, while another primary adsorbent bed is interconnected to the secondary adsorbent bed and undergoes the regeneration phases of pressure equalization, depressurization, and evacuation while so interconnected.

There can be two or more primary adsorbent beds, with the preferred number being two to four, and most preferably two or three. There will be at least one secondary adsorbent bed, preferably, one or two secondary adsorbent beds, and most preferably one secondary adsorbent bed. The primary adsorbent beds and the secondary adsorbent beds can contain the same adsorbent or the adsorbents can be different. Preferably the adsorbents are the same.

The adsorbent can be a wide-pore adsorbent where essentially all of the components of the feed gas stream can enter the pores of the adsorbent, or it can be a molecular sieve where only components of a particular molecular size will enter the pores. Preferably the adsorbent is a molecular sieve adsorbent.

The feed gas to the pressure swing adsorption system can be an upgraded or a raw non-upgraded gas stream. If the gas stream has been upgraded it usually will have been processed through a membrane separation unit with the permeate gas stream from the membrane unit usually comprising the feed gas stream to the pressure swing adsorption unit. However, the non-permeate stream also can be the feed gas to the pressure swing adsorption system. If the non-permeate gas stream is considered the primary product, the permeate gas stream will contain a minor amount of the primary product gas and a major amount of the secondary product gas. These then will be separated in the pressure swing adsorption system with the primary product gas from the pressure swing adsorption system usually being compressed and flowed to the non-permeate primary product gas stream. The use of the permeate gas stream as the feed gas to the pressure swing adsorption system may have capital and operating cost advantages over the flow of the raw feed gas stream to a stand alone membrane system.

This pressure swing adsorption system can be used to separate a number of gases. However, a preferred separation is the separation of carbon dioxide from a hydrocarbon-containing stream. The carbon dioxide is preferentially adsorbed with the hydrocarbon gases being less preferentially adsorbed and being recovered as the primary product gas. The carbon dioxide which is recovered in the evacuation phase is the secondary product gas. This gas can be recovered and used in various industrial processes.

DESCRIPTION OF THE PREFERRED EMBODIMENTS

Figure 1:
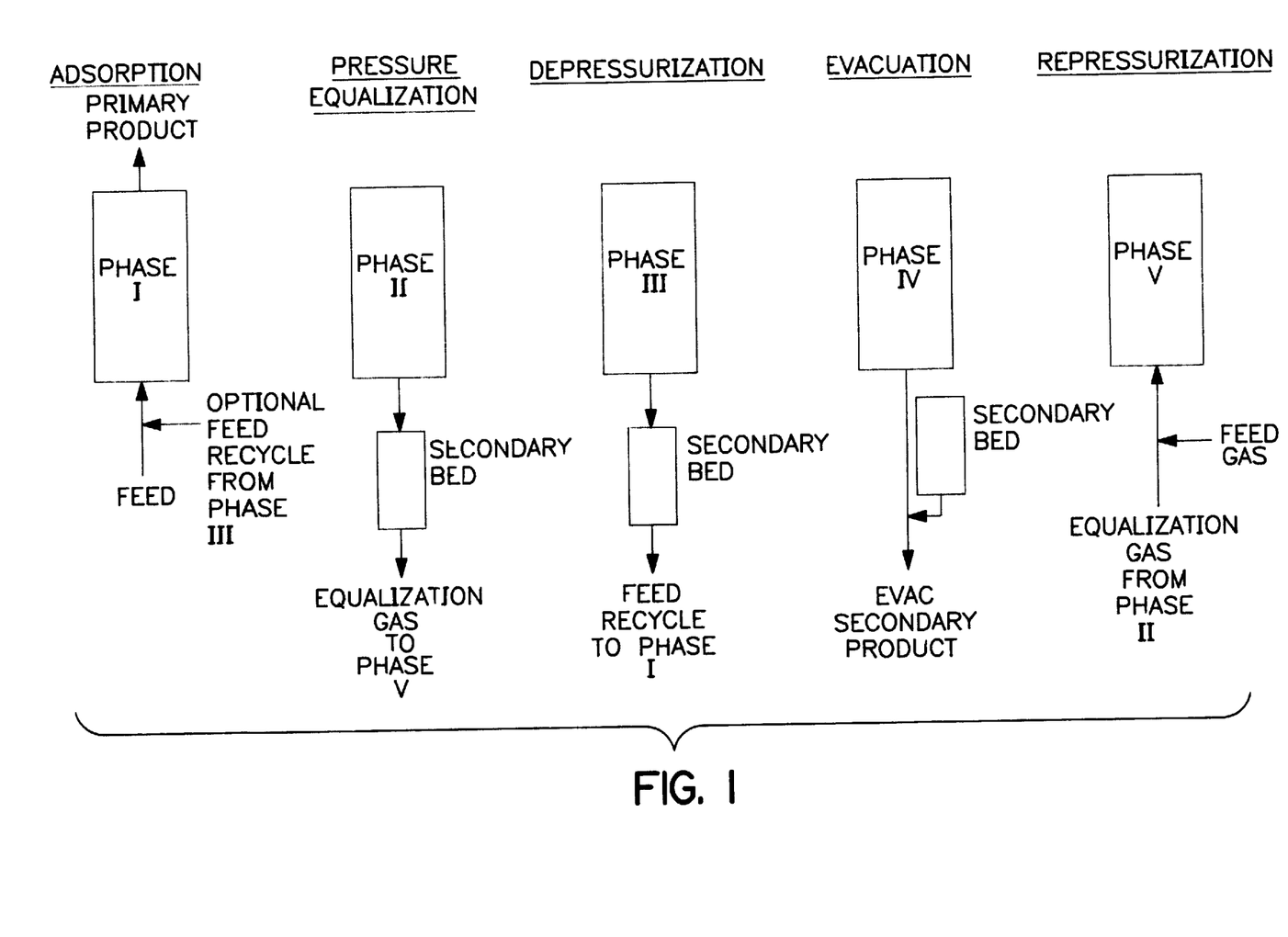
FIG. 1 is a schematic diagram showing the pressure swing adsorption process phases.

The pressure swing adsorption process now will be discussed in more detail with reference to the figures. FIG. 1 shows the five phases that the primary adsorbent beds of the pressure swing adsorption system undergo. These are:

Phase I Adsorption (Ads)
Phase II Pressure Equalization (Eq)
Phase III Depressurization (Depres)
Phase IV Evacuation (Evac)
Phase V Repressurization (Repres)

Figure 4:
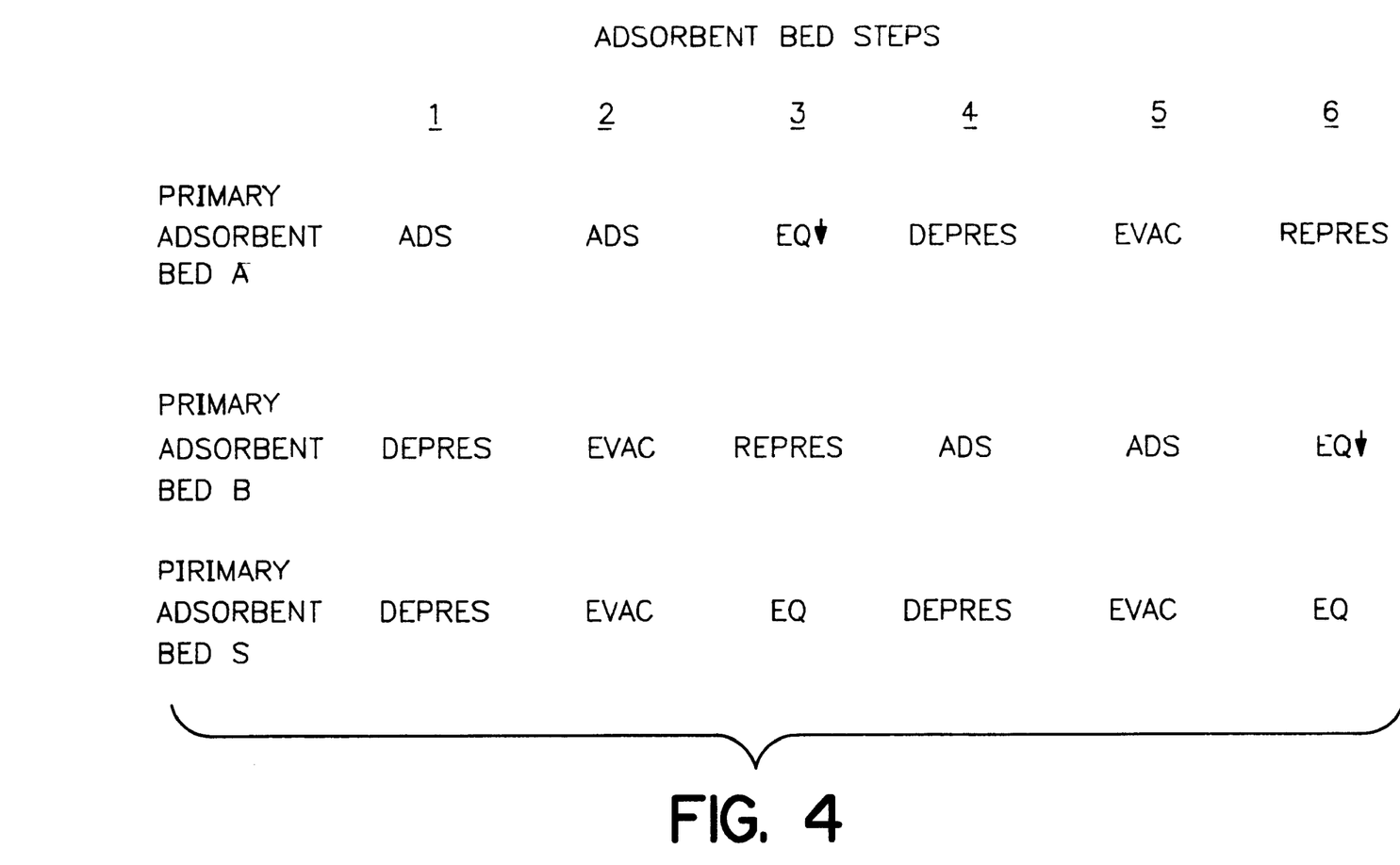
FIG. 4 is a chart of the adsorbent bed steps for the pressure swing adsorption system of FIG. 2.
Figure 5:
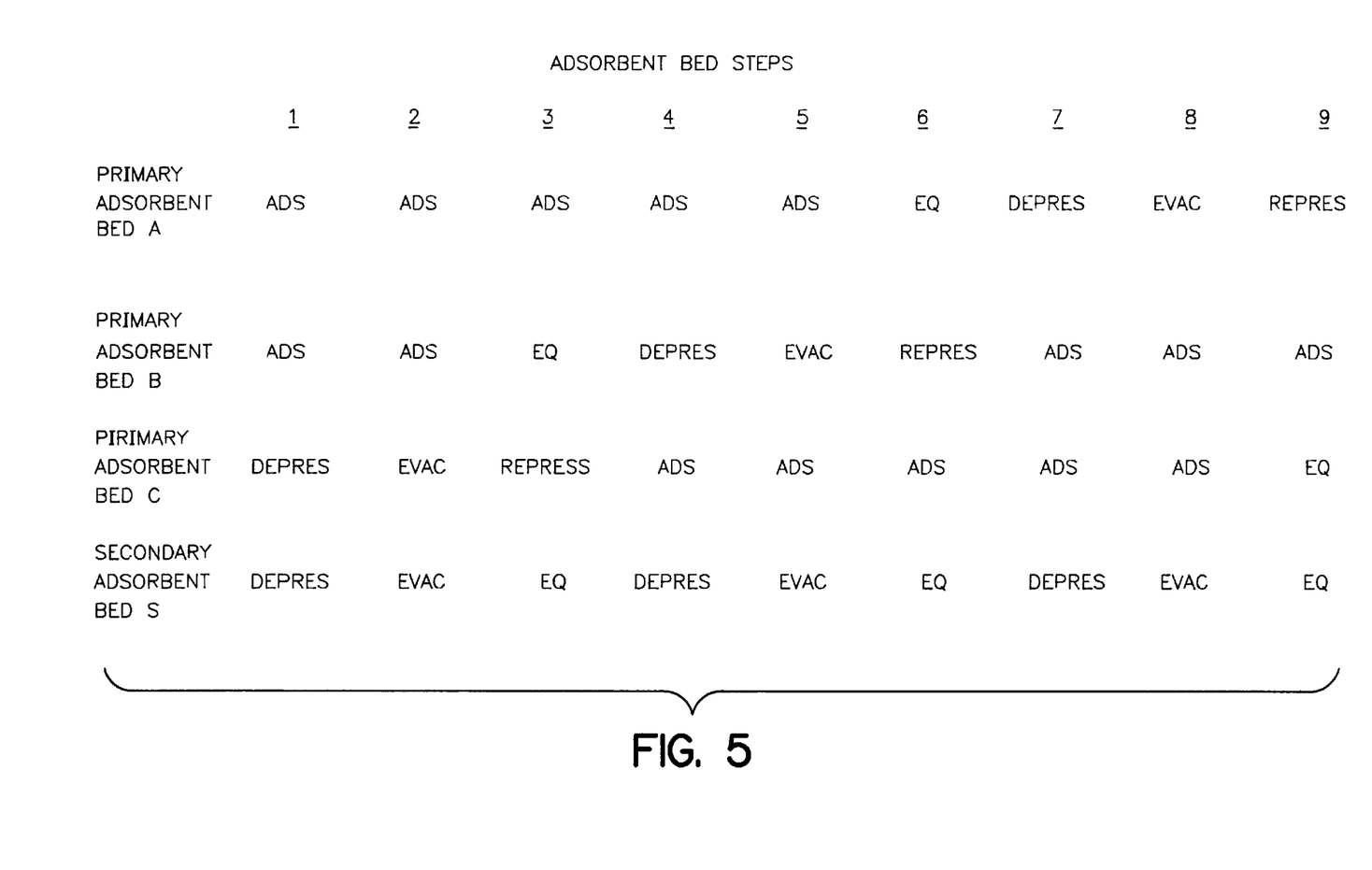
FIG. 5 is a chart of the adsorbent bed steps for the pressure swing adsorption system of FIG. 3.

The abbreviated notation for each of the phases is used in the charts of FIGS. 4 and 5.

During Phase II, Phase III, Phase IV and for at least a part of Phase V, each primary adsorbent bed is interconnected to a secondary adsorbent bed. Only the primary adsorbent beds directly receive the feed gas stream from which one or more components are to be removed. The secondary adsorbent beds do not directly receive the feed gas stream. A secondary adsorbent bed is connected to a primary adsorbent bed only when the primary adsorbent bed is to undergo regeneration. During regeneration the components that have been adsorbed by the adsorbent in the primary adsorbent beds during an adsorption phase are removed from this adsorbent. Consequently during regeneration the gases that flow from a primary adsorbent bed will flow through a secondary adsorbent bed.

In more detail of the process and with reference to FIG. 1, during Phase I adsorption a feed gas stream is flowed to a primary adsorbent bed where certain components are selectively adsorbed and removed. A primary product gas exits the primary adsorbent bed and usually is recovered. When the adsorbent in a primary adsorbent bed has become loaded with the selectively adsorbed components and prior to any significant amount of the selectively adsorbed components exiting the primary adsorbent bed (also known as break through), the flow of the feed gas stream ceases and the primary adsorbent bed undergoes regeneration. For regeneration, the primary adsorbent bed is interconnected to a secondary adsorbent bed, preferably at the input end of the primary adsorbent bed. However, they can be interconnected at the exit end of the primary adsorbent bed. The pressure is equalized in the primary adsorbent bed and in the secondary adsorbent bed, which is at a considerably lower pressure. The primary adsorbent bed is then allowed to depressurize through the secondary adsorbent bed, and a pressure equalization gas essentially equivalent to the primary product gas (a second portion) that is recovered during the adsorption phase flows from the secondary adsorbent bed. This second portion of the primary product gas is used in the Phase V repressurization step of the primary adsorbent bed. It is flowed directly to a primary adsorbent bed that is undergoing Phase V repressurization and/or to a storage tank for later use for this purpose of repressurization. This phase is allowed to continue until all three beds achieve the same pressure. After the completion of a Phase II pressure equalization, the primary adsorbent bed, while still interconnected to the secondary adsorbent bed, undergoes a Phase III depressurization step. In this phase, the primary adsorbent bed is depressurized through the secondary adsorbent bed to a lower pressure, preferably in the range of atmospheric pressure. The depressurization gas that exits the secondary adsorbent bed has a composition similar to that of the feed gas stream to the primary adsorbent beds and can be flowed to a primary adsorbent bed that is undergoing a Phase I adsorption or can otherwise be used in the plant. When this depressurization gas contains hydrocarbons, it can be used for its fuel value to operate various plant equipment.

After Phase III depressurization, the primary and secondary adsorbent beds remain interconnected and the adsorbent beds are reduced to a yet lower pressure in a Phase III evacuation, and preferably to a pressure less than atmospheric pressure, and most preferably down to a vacuum pressure of more than about 20 inches of Hg. This removes the preferentially adsorbed components of the feed gas stream from the adsorbent in the primary adsorbent bed and in the secondary adsorbent bed. This gas can be recovered as a secondary product gas or, if of little value, vented.

At this time, this primary adsorbent bed and secondary adsorbent bed can be disconnected. The primary adsorbent bed will be repressurized with the pressure equalization gas from a primary adsorbent bed undergoing a Phase II pressure equalization or with pressure equalization gas from a storage tank. The secondary adsorbent bed will be interconnected to another primary adsorbent bed that is undergoing a Phase II pressure equalization and will repeat the regeneration sequence of steps with this primary adsorbent bed. As noted, this pressure equalization gas has a composition similar to that of the primary product gas. After repressurization, this primary adsorbent bed is in a condition to undergo a Phase I adsorption.

This process sequence is repeated continuously for each of the primary adsorbent beds. There will be at least two primary adsorbent beds, and usually two to four such adsorbent beds. There can be one primary adsorbent bed or more than four primary adsorbent beds, but this usually is not economically feasible. Preferably, there are two or three primary adsorbent beds. There will be at least one secondary adsorbent bed, but there can be two or more such adsorbent beds. Usually there will be one secondary adsorbent bed.

The adsorbent in the primary adsorbent beds and secondary adsorbent bed can be the same or different. Usually it will be the same. The adsorbent can be wide-pore adsorbent, where essentially all of the components of the feed stream can enter the adsorbent and one or more be preferentially adsorbed, or it can be a molecular sieve, where only specific sized molecules can enter the adsorbent and be adsorbed. These can be carbon, alumina, silica, and aluminosilicate based adsorbents and molecular sieves. It is preferred that the adsorbent be a molecular sieve adsorbent. This can be a carbon molecular sieve or an aluminosilicate molecular sieve.

Figure 2:
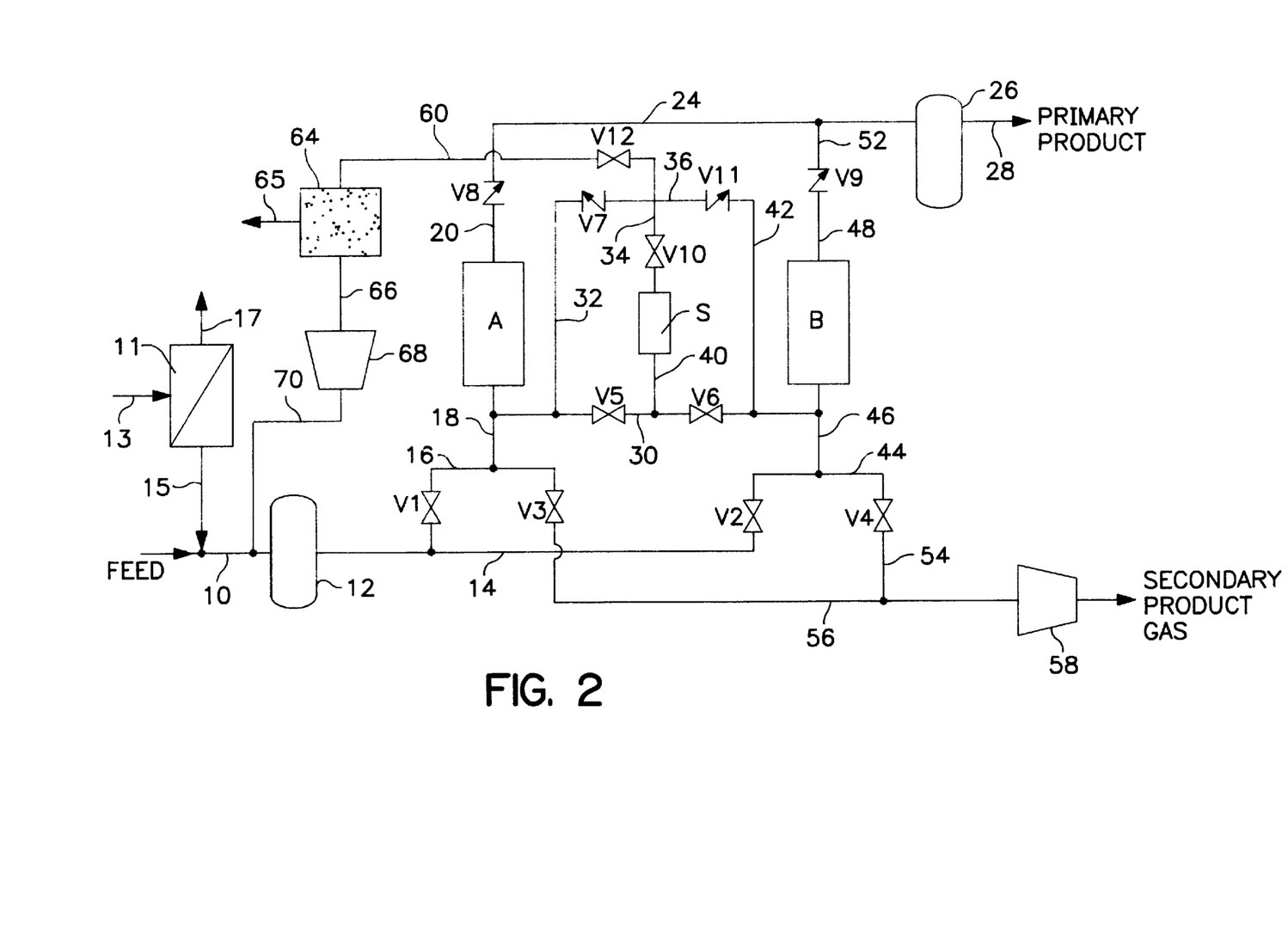
FIG. 2 is flow diagram of a two primary adsorbent bed and one secondary adsorbent bed pressure swing adsorption system.

In FIG. 2 there is disclosed a pressure swing adsorption system that utilizes two primary adsorbent beds and one secondary adsorbent bed. FIG. 4 provides a chartwise sequence of the status of each adsorbent bed of the system of FIG. 2 at any point in time. This further describes FIG. 2. A feed gas stream enters through conduit 10 and flows to tank 12. The feed gas can be an unprocessed feed gas flowing directly into conduit 10, or it can be a processed gas that has been processed in membrane unit 11. If a processed gas, the feed gas flows into membrane unit 11 through conduit 13 with a non-permeate gas exiting at conduit 17 and a permeate gas exiting at conduit 15 which then flows to conduit 10 and into tank 12. From tank 12, the gas will flow through conduit 14 to either adsorbent bed A or adsorbent bed B. The process will be discussed with a feed gas flowing to adsorbent bed A with adsorbent bed A having completed a Phase V repressurization. The feed gas flows from conduit 14 through valve VI, conduit 16 and conduit 18 and into adsorbent bed A. One or more components are selectively adsorbed in adsorbent bed A and a primary product gas flows from adsorbent bed A through conduit 20, valve V8 and conduit 24 to storage tank 26 and to a use through conduit 28. During this time valves V3, V2, V4, V5, V7, V9 and V11 have been closed.

When the feed gas is the permeate gas from membrane unit 11 the primary product of conduit 28 and the non-permeate gas from conduit 17 will in many instances have similar compositions. In such instances the primary product from conduit 28 will be compressed and flowed to the non-permeate gas of conduit 17.

Adsorbent bed B during this time has been interconnected to secondary adsorbent bed S and has completed a Phase II pressure equalization and is on a Phase III depressurization. Valve V6 is opened and gas from adsorbent bed B flows through conduits 46 and 30, through valve V6, through conduit 40 and into secondary adsorbent bed S. Valves V10 and V12 are open and a depressurization gas flows through conduits 34 and 60 to buffer vessel 64. This gas can be removed from the system at port 65 or flowed through conduit 66 to be pressurized by compressor 68. From compressor 68 the gas flows through conduit 70 to the feed line 10.

In the next step adsorbent bed A continues on a Phase I adsorption and adsorbent bed B and adsorbent bed S undergo a Phase IV evacuation. Adsorbent bed B and adsorbent bed S are evacuated by closing associated valves V2, V5, V9, V10, V11 and V12 and opening associated valves V4 and V6. Vacuum pump 58 draws a vacuum on both primary adsorbent bed B and secondary adsorbent bed S. Gas flows from adsorbent bed S through conduit 40, valve V6, conduits 46 and 44, valve V4 and conduits 54 and 56 to the vacuum pump 58. The gas from adsorbent bed B flows through conduits 46 and 44, valve V4, and conduits 54 and 56 to vacuum pump 58. This gas can be recovered as a secondary product gas.

At this time, valves V1, V4, V6 and V8 are closed and valves V5, V10 and V11 are opened to initiate a Phase V repressurization of adsorbent bed B. All other valves are closed. Adsorbent bed A has completed a Phase I adsorption and concurrently is to undergo a Phase II pressure equalization. In pressure equalization gas flows from adsorbent bed A, through conduit 18, valve V5 through adsorbent bed S through valve V10, conduit 34, valve V11 and conduits 42 and 46 and into adsorbent bed B to repressurize adsorbent bed B. At this time feed gas is used to fully pressurize adsorbent bed B to the adsorption pressure. Valve V5 is closed, as are valves V10 and V11. Valve V2 is opened to pressurize adsorbent bed B with feed gas to the adsorption pressure through conduits 14, 44 and 46. Valve V9 is then opened, whereby feed gas flows through conduit 14, valve V2 and through adsorbent bed B. A primary product flows from this adsorbent bed through conduit 48, valve V9, and conduits 52 and 24 to tank 26.

During the time that adsorbent bed B is in Phase I adsorption, adsorbent bed A is undergoing the regeneration process just completed for adsorbent bed B. Adsorbent bed A undergoes regeneration by closing valve V11 and opening valves V5, V10 and V12. Associated valves V1, V3 and V8 are closed. A depressurization gas then flows from adsorbent bed A through conduits 18 and 30, valve V5 and conduit 40 to adsorbent bed S. A depressurization gas exits this adsorbent bed S and can be recycled to feed line 10 through valve V10, conduit 34, valve V12, conduit 60, buffer vessel 64, conduit 66, compressor 68 and conduit 70 or removed from the system through valve V10, conduit 34, valve V12, conduit 60, buffer 64 and port 65. This is in essentially the same flow as the depressurization gas from adsorbent bed B as described above.

In the next Phase IV evacuation of adsorbent bed A, associated valves V3 and V5 are opened, with the other associated valves V1, V8, V7 and V10 being closed. The preferentially adsorbed gases in adsorbent bed A flow through conduits 18, 16, valve V3, and conduit 56 to vacuum pump 58. The gases from adsorbent bed S also flow through conduit 40, valve V5 and conduits 30, 18, 16, valve V3 and conduit 56 to vacuum pump 58. Upon the completion of this Phase IV evacuation, adsorbent bed A is ready to be pressurized in a Phase V repressurization. In this phase all system valves are closed except valves V10, V7 and V6. The repressurization gas flows from adsorbent bed B, through conduit 46, valve V6, conduits 30 and 40 and adsorbent bed S. A gas of essentially primary product composition exits this adsorbent bed and flows to adsorbent bed A through valve V10, conduits 34 and 36, valve V7 and conduits 32 and 18. Valve V7 is then closed and valve V1 is opened with associated valves V3, V5 and V8 closed. Feed gas flows through conduit 10, tank 12, conduit 14, valve V1 and conduits 16 and 18 to pressurize adsorbent bed A to adsorption pressure. At this point adsorbent bed A is ready to go onto a Phase I adsorption and to repeat the above process.

Figure 3:
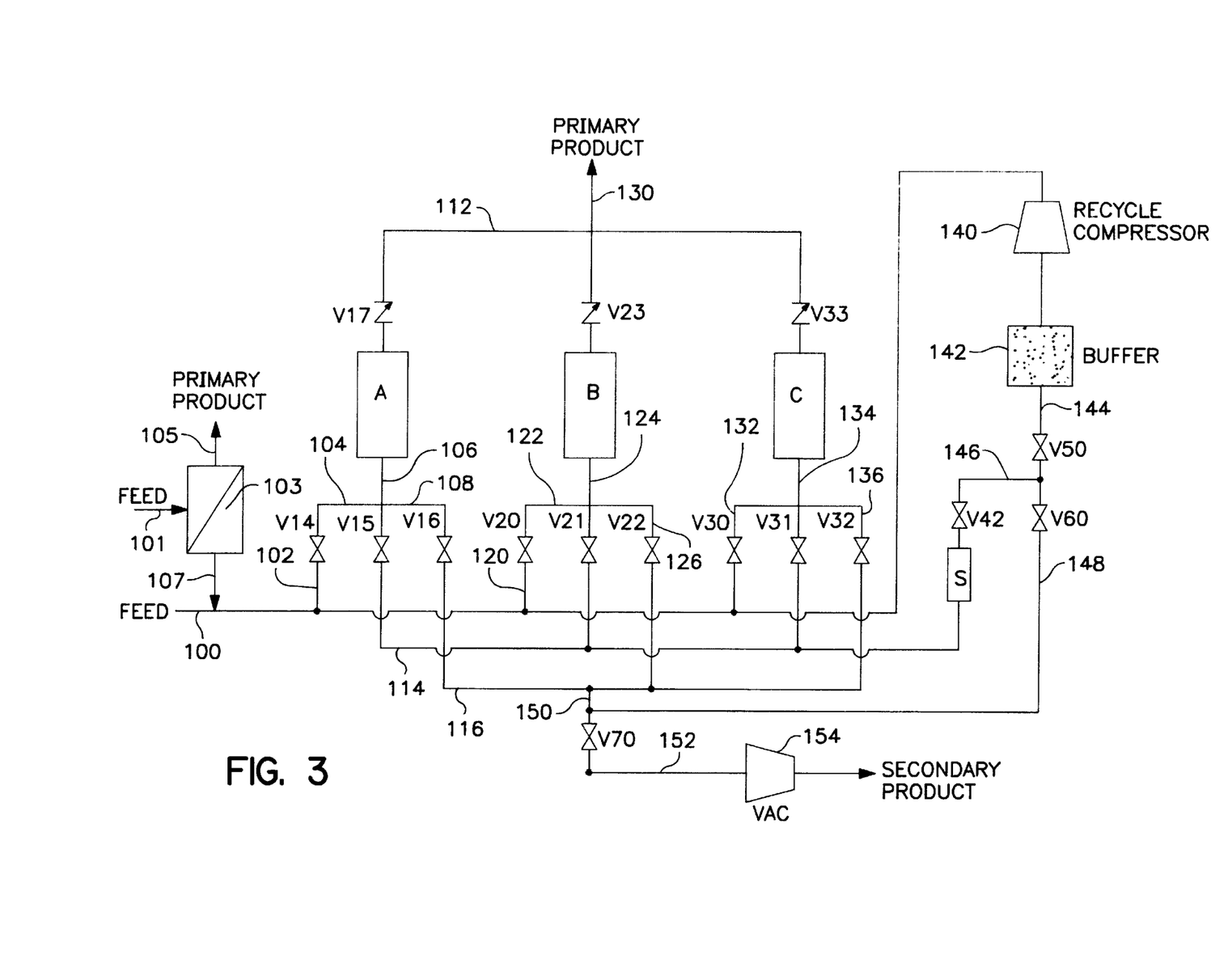
FIG. 3 is a flow diagram of a three primary adsorbent bed and one secondary adsorbent bed pressure swing adsorption system.

FIG. 3 discloses a pressure swing adsorption system of the present invention, which utilizes three primary adsorbent beds and one secondary adsorbent bed. The primary adsorbent beds are adsorbent bed A, adsorbent bed B and adsorbent bed C. The secondary adsorbent is adsorbent bed S. In this system there will be a continuous flow of the feed gas stream to the system and a continuous flow of primary product from the system. In the foregoing "two primary adsorbent bed system" there will be an intermittent flow of feed gas to the system and an intermittent flow of primary product gas from the system.

FIG. 5 provides a chartwise sequence of the status of each adsorbent bed of the system of FIG. 3 at any point in time. This FIG. 5 provides a view of the sequence that is being conducted in each adsorbent bed at any particular point in time and further describes FIG. 3.

A feed gas is fed through conduit 100 to the adsorbent beds that are on a Phase I adsorption. The feed gas can be an unprocessed gas entering directly through conduit 100 or a gas that has been processed in membrane unit 103 with a permeate feed gas flowing through conduit 107 to conduit 100. The feed gas enters the membrane unit through conduit 101 with a non-permeate gas, which on a preferred embodiment is similar in composition to the primary product, exiting the membrane unit at conduit 105. The primary product gas from conduit 130 can be combined with the non-permeate gas from conduit 105 for use. The process will be described with adsorbent bed A having just entered a Phase I adsorption. Adsorbent bed A undergoes adsorption by opening associated valves V14 and V17 and closing associated valves V15 and V16. The feed gas flows through conduits 100 and 102, Valve V14, and conduits 104 and 106 and into adsorbent bed A. A non-preferentially adsorbed gas flows from this adsorbent bed through valve V17 and conduits 112 and 130 to primary product recovery.

During this time, adsorbent bed B is completing a Phase I adsorption and undergoes a Phase II pressure equalization, Phase III depressurization and a Phase IV evacuation. During the Phase I adsorption, adsorbent bed B undergoes adsorption by opening associated valves V20 and V23 and closing associated valves V21 and V22. The feed gas stream flows through conduits 100 and 120, valve V20, and conduits 122 and 124 to adsorbent bed B with a primary product gas flowing from conduit 130. In the Phase II pressure equalization, adsorbent bed B is equalized in pressure with adsorbent bed S by opening associated valve V21 and closing associated valves V20, V22 and V23. Gas flows through conduits 124 and 114 to adsorbent bed S. A gas at about primary product composition flows from adsorbent bed S to adsorbent bed C, through valve V42, conduit 146, valve V60, and conduits 148, 150, 116, 136 and 134. Valve V32 of adsorbent bed C is open. All other adsorbent bed C valves are closed. This repressurizes adsorbent bed C, which is on a Phase V repressurization.

Adsorbent bed B then undergoes a Phase II depressurization. In this step, adsorbent bed B is depressurized by permitting associated valve V21 to remain open with associated valves V20, V22 and V23 being closed. Gas flows from adsorbent bed B through conduits 124 and 114 to adsorbent bed S and then through valve V42, conduit 146, valve V50, conduit 144, buffer vessel 142, compressor 140 conduit 100, valve V30 and conduits 132 and 134 to adsorbent bed C and conduit 102, valve V14, conduits 104 and 106 into adsorbent bed A. Valve V60 is closed. This gas to adsorbent beds A and C has about the composition of the feed gas stream.

Adsorbent bed B then enters a Phase IV evacuation. Associated valves V20 and V23 are closed, with valves V21 and V22 opened. Valves V42 and V60 associated with adsorbent bed S are closed. Valve V70 is opened and the pressure in adsorbent bed B and adsorbent bed S is decreased by the flow of gas from adsorbent bed S through conducts 114 and 124 and valve V21 where it joins gas from adsorbent bed B in conduits 124 and 126. This evacuation gas which primarily contains the one component flows through valve V22 and conduits 116 and 150 to valve V70. The evacuation gas then flows through conduit 152 to vacuum pump 154 to secondary product. The secondary product can be recovered or vented. Valve V50 is closed.

In the next step adsorbent bed B undergoes a Phase V repressurization with adsorbent bed A undergoing a Phase II pressure equalization. In this step adsorbent bed B receives a gas of about primary product composition by the flow of gas from adsorbent bed A through conduit 106, valve V15, and conduit 114 to adsorbent bed S. A repressurization gas flows from adsorbent bed S through valve V42, conduit 146, valve V60, conduits 148 and 150, valve V22 and conduits 126 and 124 to adsorbent bed B. Once pressure is equalized in adsorbent beds A, B and S, adsorbent bed B is further pressurized by closing valve V22 and opening valve V20. Valves V21 and V23 remain closed. Once adsorbent bed B is pressurized to the adsorption pressure, adsorbent bed B then is in a condition to undergo a Phase I adsorption by the flow of feed gas through conduits 100 and 120, valve V20 and conduits 122 and 124. Adsorbent bed A then undergoes a Phase III depressurization, Phase VI evacuation and a Phase V repressurization.

The Phase III depressurization of adsorbent bed A consists of opening associated valve V15, while all other valves associated with adsorbent bed A are closed. Gas flows through conduit 106, valve V15 and conduit 114 to adsorbent bed S. A gas of about feed gas composition flows from adsorbent bed S through valve V42, conduit 146, valve V50, conduit 144, buffer 142, compressor 140 and line 100 to adsorbent bed B and adsorbent bed C. Adsorbent bed A then undergoes a Phase IV evacuation by opening valves V15 and V16 and closing all other valves associated with adsorbent bed A. Valves V42 and V60 are closed. Gas then flows from adsorbent bed A through conduits 106, 108, 116 and 150 to valve V70 and then by conduit 152 to vacuum pump 154 and secondary product. Gas flows from adsorbent bed S through conduit 114, valve V15, conduit 108 and valve V16, conduits 116 and 150 to valve V70 conduit 152, vacuum pump 154 and to secondary product. Adsorbent bed A then goes into a Phase V repressurization by receiving a pressure equalization gas from adsorbent bed C. This gas flows from adsorbent bed C through conduit 134, valve V31, conduit 114, adsorbent bed S, valve V42, conduit 146, valve V60, conduits 148, 150, 116, valve V16, and conduits 108 and 106 to adsorbent bed A.

During the period of time that adsorbent bed A and adsorbent bed B have been undergoing the above phases, adsorbent bed C in sequence has been undergoing a Phase III depressurization, Phase IV evacuation, Phase V repressurization, Phase I adsorption and Phase II pressure equalization. In the Phase III depressurization, associated valve V31 is open with associated valves V30, V32 and V33 closed. Gas flows from adsorbent bed C through conduit 134, valve V31 and conduit 114 to adsorbent bed S. The gas then flows through valve V42, conduit 146, valve V50, conduit 144, buffer vessel 142, compressor 140 and conduit 100 to adsorbent bed A and adsorbent bed B. This gas has a composition of about the feed gas composition. Adsorbent bed C then undergoes a Phase IV evacuation. In this phase associated valves V30, and V33 are closed with valves V31 and V32 open. Gas flows through conduit 134, conduit 136, valve V32, conduit 116, conduit 150, valve V70 and conduit 152 to vacuum pump 154. Gas also flows from adsorbent bed S through conduit 114, valve V31, conduit 136, valve V32, conduits 116 and 150, valve V70 and conduit 152 to the vacuum pump 154 and secondary product. In this step the preferentially adsorbed components are removed from adsorbent bed C and adsorbent bed S. Adsorbent bed C then undergoes a Phase V repressurization. In this step gas from the adsorbent bed B pressure equalization step is flowed to adsorbent bed C. Gas flows from adsorbent bed B through conduit 124, valve V21, and conduit 114 to adsorbent bed S. The non-adsorbed gas then flows through valve V42, conduit 146, valve V60, conduit 148, conduit 150, conduit 116, valve V32, conduit 136 and conduit 134 into adsorbent bed C. This gas has a composition about that of the primary product. Adsorbent bed C is further pressurized with feed gas by closing valves V31, V32 and V33 and opening valve V30. Feed gas flows through conduit 100, valve V30, conduits 132 and 134 and into adsorbent bed C until bed C is pressurized to the adsorption pressure. Adsorbent bed C then undergoes a Phase I adsorption where associated valves V31 and V32 are closed and associated valves V30 and V33 are open. Feed gas flows through conduit 100, valve V30, conduit 132 and conduit 134 and into adsorbent bed C. A product gas exits this adsorbent bed C and flows through valve V33 and conduit 112 to conduit 130.

This completes the description of the preferred embodiments of the present pressure swing adsorption processes. Various gases can be separated using these processes. A preferred separation is that of carbon dioxide from hydrocarbon gases, such as a natural gas.

The phase timing will be dependent on the gases being separated, adsorbent bed sizes, gas flows and other factors. However, a cycle time where a cycle is each adsorbent bed undergoing all phases can range from about 1 minute to about 15 minutes, and usually from about 2 minutes to about 10 minutes. The pressures of the feed gas can range from about 50 psig to about 1000 psig. The flow rates will depend on the size and time cycle of the system.

EXAMPLE

A test unit has a primary adsorbent bed containing 2 liters of a carbon molecular sieve and a secondary adsorbent bed containing 0.4 liter of a carbon molecular sieve. The two adsorbent beds are interconnected and undergo the phases of FIG. 1. A primarily methane feed gas (70 percent methane and 30 percent carbon dioxide) is fed to the primary adsorbent bed at a pressure of 124.7 psia and a flow rate of 4 SCF/cycle (standard cubic feet per cycle). A primary product gas composed of 98 percent methane is recovered at a flow of 2.8 SCF/cycle. The recovery of methane is 99 percent.

What is claimed is:

1. A method for the removal of at least one component from a feed gas stream containing a plurality of components comprising:

providing a plurality of primary adsorbent beds comprising at least a first primary adsorbent bed and a second primary adsorbent bed and further providing at least one secondary adsorbent bed, each adsorbent bed containing an adsorbent selective for the component;

flowing the feed gas stream at an elevated pressure to the first primary adsorbent bed to selectively adsorb the component and to recover a first portion of a gas stream substantially depleted of the component until the adsorbent in the first primary adsorbent bed has become loaded with the component and prior to any significant amount of the component exiting the first primary adsorbent bed;

terminating the flow of the feed gas stream to the first primary adsorbent bed;

interconnecting the first primary adsorbent bed to the secondary adsorbent bed and flowing a pressure equalization gas from the first primary adsorbent bed through the secondary adsorbent bed and recovering therefrom a second portion of the gas substantially depleted of the component;

flowing at least some of the second portion of the gas to the second primary adsorbent bed to increase the pressure thereof prior to the second primary adsorbent bed's receiving the feed gas stream;

decreasing the pressure of the first primary adsorbent bed through the secondary adsorbent bed to a first further lower pressure and recovering a depressurization gas;

further decreasing the pressure of the first primary adsorbent bed and the secondary adsorbent bed to a second further lower pressure to substantially remove the component therefrom;

disconnecting the first primary adsorbent bed from the secondary adsorbent bed; and flowing at least some of the second portion of the gas from the second primary adsorbent bed to the first primary adsorbent bed to increase the pressure thereof.

2. The method of claim 1, wherein, while the first primary adsorbent bed is receiving the feed gas stream, the second primary adsorbent bed is interconnected to the secondary adsorbent bed to substantially equalize the pressure in the second primary adsorbent bed and the secondary adsorbent bed and depressurize the second primary adsorbent bed through the secondary bed;

recovering a second portion of the gas substantially depleted of the component;

flowing at least some of the second portion of the gas to the first primary adsorbent bed to increase the pressure thereof prior to the first primary adsorbent bed's receiving the feed gas stream;

decreasing the pressure of the second primary adsorbent bed and the secondary adsorbent bed to a first further lower pressure and recovering a depressurization gas;

further decreasing the pressure of the second primary adsorbent bed and the secondary adsorbent bed to a second further lower pressure to substantially remove the component therefrom; and disconnecting the second primary adsorbent bed from the secondary adsorbent bed.

3. The method of claim 1 further comprising the step of flowing the feed gas stream to a membrane separation unit prior to flowing it to the first primary adsorbent bed, whereby the feed gas stream is separated into a non-permeate stream and a permeate stream, the permeate stream comprising the feed gas stream to the first primary adsorbent bed.

4. The method of claim 1, wherein the plurality of primary adsorbent beds comprises a first primary adsorbent bed, a second primary adsorbent bed, and a third primary adsorbent bed and while the first primary adsorbent bed is receiving the feed gas stream and selectively adsorbing the component with the recovering of a first portion of a gas stream substantially depleted of the component until the adsorbent in the first primary adsorbent bed has become loaded with the component and prior to any significant amount of the component exiting the first primary adsorbent bed;

substantially concurrently interconnecting the second primary adsorbent bed with the secondary adsorbent bed;

substantially equalizing the pressure in the second primary adsorbent bed and the secondary adsorbent bed and depressurizing the second primary adsorbent bed through the secondary adsorbent bed and recovering a second portion of the gas stream substantially depleted of the component from the secondary adsorbent bed;

further depressurizing the second primary adsorbent bed through the secondary adsorbent bed to a first further lower pressure and recovering a depressurization gas;

further decreasing pressure in the second primary adsorbent bed and the secondary adsorbent bed to a second further lower pressure and removing the component therefrom;

substantially concurrently flowing at least a portion of the second portion of the gas to the third adsorbent bed to increase the pressure within the third adsorbent bed;

disconnecting the flow of the second portion of the gas; and recovering the gas substantially depleted in the component.

5. The method of claim 4 further comprising the step of flowing the feed gas stream to a membrane separation unit prior to flowing it to the first primary adsorbent bed, whereby the feed gas stream is separated into a non-permeate stream and a permeate stream, the permeate stream comprising the feed gas to the first primary adsorbent bed.

6. The method of claim 1, wherein the depressurization gas is increased in pressure and flowed to the first adsorbent bed.

7. The method of claim 1, wherein each of the primary adsorbent beds sequentially undergoes each of five phases, said five phases comprising:

an adsorption phase, a pressure equalization phase with the secondary adsorbent bed, a depressurization phase with the secondary adsorbent bed, an evacuation phase with the secondary adsorbent bed, and a repressurization phase with gas from the pressure equalization with the secondary adsorbent bed.

8. The method of claim 1, wherein the secondary adsorbent bed sequentially undergoes each of three phases with a given primary adsorbent bed, said three phases comprising a pressure equalization phase with the primary adsorbent bed, a depressurization phase with the primary adsorbent bed, and an evacuation phase with the primary adsorbent bed.

9. The method of claim 1, wherein the component is a non-hydrocarbon gas.

10. The method of claim 9, wherein the component is carbon dioxide and the feed gas stream is primarily a hydrocarbon gas stream.

11. The method of claim 1, wherein the adsorbent in each primary adsorbent bed and the secondary adsorbent bed is selected from the group consisting of carbon, alumina, silica, and aluminosilicate based adsorbents and molecular sieves.

12. A method for the removal of at least one component from a feed gas stream containing a plurality of components comprising:

providing at least two primary adsorbent beds comprising at least a first primary adsorbent bed and a second primary adsorbent bed and further providing at least one secondary adsorbent bed, each of the beds containing an adsorbent selective for at least one component;

flowing the feed gas stream to a first primary adsorbent bed to selectively remove the component and to recover at least a first portion of the gas stream substantially depleted of the component;

substantially concurrently interconnecting the second primary adsorbent bed and the secondary adsorbent bed;

substantially equalizing the pressure in the second primary adsorbent bed and the secondary adsorbent bed by depressurizing the second primary adsorbent bed through the secondary adsorbent bed and recovering a second portion of the gas stream substantially depleted of the component therefrom;

depressurizing the second primary adsorbent bed through the secondary adsorbent bed to a lower pressure and recovering a depressurization gas; and depressurizing the second primary adsorbent bed and the secondary adsorbent bed to a further lower pressure to remove the component therefrom.

13. The method of claim 12, wherein the second portion is flowed to the first primary adsorbent bed.

14. The method of claim 12, wherein the depressurization gas is increased in pressure and flowed to the first adsorbent bed.

15. The method of claim 12, wherein the component is a non-hydrocarbon gas and the feed gas stream is primarily a hydrocarbon gas stream.

16. The method of claim 12, wherein the adsorbent in each adsorbent bed is selected from the group consisting of carbon, alumina, silica, and aluminosilicate based adsorbents and moletular sieves.

17. The method of claim 12 further comprising the step of flowing the feed gas stream to a membrane separation unit prior to flowing it to the first primary adsorbent bed, whereby the feed gas stream is separated into a non-permeate stream and a permeate stream, the permeate stream comprising the feed gas stream to the first primary adsorbent bed.

18. A method for the removal of at least one component from a feed gas stream containing a plurality of components comprising:

providing at least three primary adsorbent beds comprising at least a first primary adsorbent bed, a second primary adsorbent bed, and a third primary adsorbent bed and further providing at least one secondary adsorbent bed, each of the beds containing an adsorbent selective for at least one component;

flowing the feed gas stream to the first primary adsorbent bed and substantially removing the component therefrom;

substantially concurrently interconnecting the second primary adsorbent bed and the secondary adsorbent bed;

equalizing pressure in the second primary adsorbent bed and the secondary adsorbent bed and flowing a second portion of a gas substantially depleted of the component from the secondary adsorbent bed;

flowing the second portion to the third primary adsorbent bed to increase the pressure therein;

decreasing the pressure in the second primary adsorbent bed through the secondary adsorbent bed to a lower pressure and recovering a depressurization gas;

further reducing the pressure in the second primary adsorbent bed and the secondary adsorbent bed to a yet lower pressure to substantially remove the component therefrom; and flowing the feed gas stream to the third primary adsorbent bed and recovering a first portion of a gas substantially depleted in the component.

19. The method of claim 18, wherein depressurization gas is increased in pressure and flowed to the first primary adsorbent bed or the third primary adsorbent bed.

20. The method of claim 18, wherein the component is a non-hydrocarbon gas and the feed gas stream is primarily a hydrocarbon gas stream.

21. The method of claim 18, wherein the adsorbent in each adsorbent bed is selected from the group consisting of carbon, alumina, silica, and aluminosilicate based adsorbents and molecular sieves.

22. The method of claim 18 further comprising the step of flowing the feed gas stream to a membrane separation unit prior to flowing it to the first primary adsorbent bed, whereby the feed gas stream is separated into a non-permeate stream and a permeate stream, the permeate stream comprising the feed gas stream to the first primary adsorbent bed.

* * * * *